(12) United States Patent
Nelson et al.

(10) Patent No.: US 9,760,959 B2
(45) Date of Patent: Sep. 12, 2017

(54) SYSTEMS AND METHODS FOR MINIMIZING TRAVEL COSTS FOR MULTI-NIGHT STAYS

(71) Applicants: Daniel A. Nelson, Lehi, UT (US); Ryan Williams, Lehi, UT (US); Ryan McCoy, Lehi, UT (US); Neil Valentine, Lehi, UT (US); Steven Dalley, Lehi, UT (US); Bradley P. Pace, Lehi, UT (US)

(72) Inventors: Daniel A. Nelson, Lehi, UT (US); Ryan Williams, Lehi, UT (US); Ryan McCoy, Lehi, UT (US); Neil Valentine, Lehi, UT (US); Steven Dalley, Lehi, UT (US); Bradley P. Pace, Lehi, UT (US)

(73) Assignee: Reservation Counter, LLC, Lehi, UT (US)

( * ) Notice: Subject to any disclaimer, the term of this patent is extended or adjusted under 35 U.S.C. 154(b) by 964 days.

(21) Appl. No.: 13/914,594

(22) Filed: Jun. 10, 2013

(65) Prior Publication Data
US 2014/0337068 A1    Nov. 13, 2014

Related U.S. Application Data

(63) Continuation-in-part of application No. 13/891,015, filed on May 9, 2013.

(51) Int. Cl.
*G06Q 50/12* (2012.01)
*G06Q 10/02* (2012.01)

(52) U.S. Cl.
CPC ........... *G06Q 50/12* (2013.01); *G06Q 10/025* (2013.01)

(58) Field of Classification Search
CPC ..................................................... G06Q 10/02
(Continued)

(56) References Cited

U.S. PATENT DOCUMENTS

| | | | |
|---|---|---|---|
| 7,328,166 B1* | 2/2008 | Geoghegan | G06Q 10/02 705/5 |
| 7,415,419 B2* | 8/2008 | Widjaja | G06Q 10/02 705/5 |

(Continued)

OTHER PUBLICATIONS

Thorin Klosowski, How Web Sites Vary Prices Based on Your Information (and What You Can Do About It), Lifehacker.com, 6 pages.*

*Primary Examiner* — Brian Epstein
*Assistant Examiner* — Omar Zeroual
(74) *Attorney, Agent, or Firm* — Michael F. Krieger; Kirton McConkie

(57) ABSTRACT

A lowest rate on a multi-night lodging stay is achieved by obtaining lodging rate information for a first lodging location from a plurality of lodging rate sources. The information is correlated with each night of a window during which a consumer is available to travel. A block of nights within the window having the lowest lodging rate is identified. Then, a plurality of lodging reservations corresponding to the identified block are generated, wherein at least two of the lodging reservations correspond to different nights of the multi-night lodging stay and are placed through different lodging reservation systems. A block having the lowest total cost of travel can also be identified by considering the cost of other travel related expenses in conjunction with the lodging rate for the block.

8 Claims, 9 Drawing Sheets

(58) Field of Classification Search
USPC .......................................................... 705/5, 6
See application file for complete search history.

(56) References Cited

U.S. PATENT DOCUMENTS

| | | | | |
|---|---|---|---|---|
| 7,483,883 B2* | 1/2009 | Barth | ................ | G06F 17/30867 |
| 7,668,809 B1* | 2/2010 | Kelly | ................ | G06F 17/30528 |
| | | | | 705/5 |
| 7,668,811 B2* | 2/2010 | Janssens | ................ | G06Q 10/02 |
| | | | | 707/704 |
| 7,769,610 B2* | 8/2010 | Liew | ................ | G06Q 10/02 |
| | | | | 705/1.1 |
| 7,917,387 B2* | 3/2011 | Spurr | ................ | G06Q 30/02 |
| | | | | 705/14.24 |
| 7,979,457 B1* | 7/2011 | Garman | ................ | G06F 17/30864 |
| | | | | 705/26.8 |
| 8,600,784 B1* | 12/2013 | Ivey | ................ | G06Q 10/02 |
| | | | | 705/5 |
| 8,719,251 B1* | 5/2014 | English | ................ | G06F 17/30864 |
| | | | | 707/713 |
| 8,972,434 B2* | 3/2015 | English | ................ | G06Q 30/0603 |
| | | | | 707/706 |
| 9,009,145 B2* | 4/2015 | Cahill | ................ | G06F 17/30864 |
| | | | | 701/410 |
| 2002/0156661 A1* | 10/2002 | Jones | ................ | G06Q 10/02 |
| | | | | 705/6 |
| 2005/0033616 A1* | 2/2005 | Vavul | ................ | G06Q 10/02 |
| | | | | 705/5 |
| 2005/0043974 A1* | 2/2005 | Vassilev | ................ | G06Q 10/02 |
| | | | | 705/5 |
| 2005/0086087 A1* | 4/2005 | Razza | ................ | G06Q 10/025 |
| | | | | 705/5 |
| 2006/0161480 A1* | 7/2006 | Christensen | ................ | G06Q 10/02 |
| | | | | 705/14.1 |
| 2007/0226020 A1* | 9/2007 | Park | ................ | G06Q 10/02 |
| | | | | 705/5 |
| 2007/0271123 A1* | 11/2007 | Miyashita | ................ | G06Q 10/02 |
| | | | | 705/5 |
| 2008/0091482 A1* | 4/2008 | Whitsett | ................ | G06Q 10/025 |
| | | | | 705/6 |
| 2009/0030743 A1* | 1/2009 | Tussy | ................ | G06Q 50/12 |
| | | | | 705/5 |
| 2009/0063167 A1* | 3/2009 | Bartot | ................ | G06Q 30/0283 |
| | | | | 705/1.1 |
| 2010/0198628 A1* | 8/2010 | Rayner | ................ | G06Q 10/025 |
| | | | | 705/6 |
| 2010/0293011 A1* | 11/2010 | Lebreton | ................ | G06Q 10/02 |
| | | | | 705/5 |
| 2011/0218830 A1* | 9/2011 | Gonzalez | ................ | G06Q 10/10 |
| | | | | 705/5 |
| 2012/0215601 A1* | 8/2012 | McGuire | ................ | G06Q 30/0239 |
| | | | | 705/14.13 |
| 2013/0073323 A1* | 3/2013 | Zacharia | ................ | G06Q 10/025 |
| | | | | 705/5 |
| 2014/0089020 A1* | 3/2014 | Murphy | ................ | G06Q 10/02 |
| | | | | 705/5 |
| 2015/0032768 A1* | 1/2015 | Miller | ................ | G06Q 10/02 |
| | | | | 707/769 |
| 2015/0073941 A1* | 3/2015 | Burrows | ................ | G06Q 10/02 |
| | | | | 705/26.62 |

* cited by examiner

|  | T | W | TH | F | S | Total |
|---|---|---|---|---|---|---|
| MGM | $$$ | $$ | $$ | $$$ | $$$$ | $14 |
| OTA 1 | $$$ | $ | $$$ | $$ | $$$$ | $13 |
| OTA 2 | $$ | $$ | $$$ | $$$ | $$ | $12 |

|  | T | W | TH | F | S | Total |
|---|---|---|---|---|---|---|
| MGM | $$$ | $$ | $$ | $$$ | $$$$ | $14 |
| OTA 1 | $$$ | $ | $$$ | $$ | $$$$ | $13 |
| OTA 2 | $$ | $$ | $$$ | $$$ | $$ | $12 |
| Best Rate | $$ | $ | $$ | $$ | $$ | $9 |

*FIG. 1*

SYSTEMS AND METHODS FOR MINIMIZING TRAVEL COSTS FOR MULTI-NIGHT STAYS

CROSS-REFERENCE TO RELATED APPLICATIONS

This application is a continuation-in-part of U.S. patent application Ser. No. 13/891,015, which was filed on May 9, 2013, and is titled Systems and Methods for Minimizing Travel Costs for Multi-Night Stays.

BACKGROUND OF THE INVENTION

1. Field of the Invention

The present invention relates to travel costs, and more particularly to systems and methods for minimizing travel costs for multi-night stays.

2. Background and Related Art

Many individuals have travel needs for business or pleasure. Travelers incur many costs when traveling, including transportation, food, and lodging costs. Each traveler has certain priorities when traveling: some travelers most value convenience and a high-quality experience, while other travelers seek to minimize traveling costs. For example, some business travelers have very tight schedules and business expectations and may be traveling at company expense. Such business travelers may therefore be willing to spend more to guarantee a highest level of convenience and comfort. Meanwhile, a family on a tight budget might be very cost conscious and may be willing to deal with some inconvenience to get the best price on their travel options.

The travel industry has evolved solutions attempting to address the varying needs of different types of travel consumers. Travelers can select between first class and coach seats when selecting flights, and can often select between direct flights between destinations at a higher cost and multi-leg flights between the same destinations at a lower cost. Travelers can also select between more luxurious accommodations or less luxurious accommodations within a hotel, or may select between various available hotels based on quality of the hotel and/or based on proximity to a location of interest. Similar decisions can be made with respect to nearly every aspect of travel, from food to entertainment to rental vehicles and so forth.

Traditional travel agents evolved to advise travelers and to help travelers intelligently select among the various options when traveling. Travel agents also often helped make travel-associated reservations, including for lodging, airfare or other transportation, tours and entertainment, and the like. With the advent of the Internet, online travel agencies (OTAs) have been created and have evolved to provide many of the same functions to consumers. Some OTAs have focused on a particular aspect of travel (e.g. transportation, lodging, entertainment), and other OTAs attempt to more generally provide information and booking options for multiple aspects of travel. In addition to third-party OTAs, some lodging and transportation providers are providing similar features. Examples of existing OTAs include Expedia, Travelocity, Orbitz, Hotwire, Priceline.com, Hotels.com, Booking.com, among others. Additionally, some parties, such as Kayak, Mobissimo, and Travago, aggregate travel search results and options from multiple OTAs into a single location for presentation to the consumer. Furthermore, many travel providers provide OTA-like services directly to consumers.

In a typical user experience, a consumer may visit a website of an OTA and may enter desired travel options, such as expected dates and locations of travel, desired class of transportation or lodging, etc., as well as whether the consumer is flexible in either travel dates or location. The OTA then searches available deals and presents search results to the consumer through the website. Depending on the function of the OTA, the OTA may search only deals under its own contracts with providers, or it may search available deals through other providers, including potentially through other OTAs. The results are often presented to the user using a view selected to convey certain travel options to the consumer. For example, the view may be a list view showing a list of options and associated costs, potentially along with other information about the options. As another example, the view may be a calendar view showing variations in pricing if the dates of the travel are varied. As another example, the view may be a matrix view, with various axes of the matrix illustrating various travel options, and with price and potentially other options located in each of the cells of the matrix. Regardless, information may be presented to the consumer using any of a number of views, and OTAs are continually evaluating the best way in which to present information and changing how information is displayed.

Consumers utilize OTAs to research and obtain the best travel deals, and often use the OTAs to book or reserve travel accommodations and amenities. One particular use of OTAs or other travel providers, whether online or not, is to obtain lodging accommodations, including multi-night stays. Most consumers think of multi-night stays and other aspects of travel as a unit having a single price that can be compared across various providers (either lodging providers directly or through OTAs) and do not consider that multi-night stays are actually made up of an itinerary of single-night stays that often vary in rate depending on many daily factors such as demand, holidays, and the like. OTAs and other travel providers do not help consumers overcome their misunderstanding, and consumers are therefore unlikely to understand the factors that make up the rates they are quoted by the various OTAs.

Despite all the advances that have occurred in recent years, existing OTAs still are unable to ensure that cost-conscious consumers are able to get the best possible deal on their travel needs.

BRIEF SUMMARY OF THE INVENTION

Implementation of the invention provides systems, methods, and non-transitory computer readable media storing computer program code instructions to cause a computer to execute methods of obtaining a lowest rate on a multi-night lodging stay. In accordance with implementations of the invention, a method for obtaining a lowest rate on a multi-night lodging stay includes obtaining lodging rate information for a first lodging location from a plurality of lodging rate sources and receiving, from a consumer, information defining a desired multi-night lodging stay at the first lodging location. The method also includes comparing the information defining the desired multi-night lodging stay to the lodging rate information from the plurality of lodging rate sources to locate a lowest lodging rate for each of the nights of the desired multi-night lodging stay and generating a plurality of lodging reservations corresponding to the multi-night lodging stay, wherein at least two of the lodging reservations correspond to different nights of the multi-night lodging stay and are placed through different lodging reservation systems.

Obtaining lodging rate information may include automatically conducting rate searches at the plurality of lodging rate sources when the information defining a desired multi-night lodging stay is received from the consumer, conducting rate searches at the plurality of lodging rate sources prior to receipt of information defining a desired multi-night lodging stay and storing the lodging rate information in a database of rate information and obtaining lodging rate information from each lodging rate source corresponding to a plurality of all permutations of stays of varying lengths within the desired multi-night lodging stay to locate any special rates available for multi-night less stays no longer than the desired multi-night lodging stay. Comparing the information defining the desired multi-night lodging stay to the lodging rate information may include selecting a first night of the multi-night lodging stay, determining a lowest available lodging rate for the first night through each of the information sources, selecting an information source having the lowest lodging rate for the first night, and repeating the steps of selecting a night, determining the lowest available rate, and selecting an information source having the lowest lodging rate for each night of the desired multi-night lodging stay.

The method may also include updating the lodging rate information from the plurality of lodging rate sources throughout a period of time during which any of the plurality of lodging reservations is subject to cancellation, automatically comparing current rate information to rates of the plurality of lodging reservations, and when a current rate for a given night is less than a rate at which the given night was reserved: automatically canceling an original reservation for the given night and automatically making a new reservation for the given night at the current rate. The new reservation may be made through a different lodging reservation system than the original reservation or through the same lodging reservation system.

The method may also include obtaining lodging rate information for a second lodging location in geographic proximity to the first lodging location from at least one lodging rate source and comparing the lodging rate information for the second lodging location with the lodging rate information for the first lodging location, wherein the plurality of lodging reservations comprises lodging reservations of at least one night at the first lodging location and of at least one night at the second lodging location.

The method may further include providing a notice to the consumer that a lowest possible rate may require switching rooms during the multi-night lodging stay and receiving an action from the consumer indicating a willingness to accept the possibility of having to switch rooms during the multi-night lodging stay.

According to implementations of the invention, a method for obtaining a lowest rate on a multi-night lodging stay includes obtaining lodging rate information for a first lodging location from a plurality of lodging rate sources, receiving, from a consumer, information defining a desired multi-night lodging stay at the first location, and comparing the information defining the desired multi-night lodging stay to the lodging rate information from the plurality of lodging rate sources to determine a source of a lowest lodging rate for each of the nights of the desired multi-night lodging stay. The method also includes assembling a lodging reservation itinerary comprising multiple independent lodging stays of one or more nights forming in sum an itinerary covering the desired multi-night lodging stay, calculating a total price of the lodging reservation itinerary, displaying the total price of the lodging reservation itinerary to the consumer as a lowest possible rate on the desired multi-night lodging stay, and generating a plurality of lodging reservations corresponding to the multi-night lodging stay, wherein at least two of the lodging reservations correspond to different nights of the multi-night lodging stay and are placed through different lodging reservation systems.

According to implementations of the invention, a method for determining which of a plurality of blocks of nights within a window of nights will have the lowest rate for a multi-night lodging stay comprises receiving, from a consumer, a request to identify the lowest rate for a multi-night lodging stay at a first lodging location. The request identifies a number of nights for the multi-night lodging stay and a window of nights during which the consumer is available to stay at the first lodging location. The window encompasses more nights than the number of nights identified in the request such that a plurality of different blocks of consecutive nights exist within the window. Lodging rate information for the first lodging location for each of the nights in the window is automatically obtained. The lodging rate information is obtained from a plurality of lodging rate sources. The lodging rate information obtained from each of the plurality of lodging rate sources is compared to identify a lowest lodging rate for each night in the window. For each different block in the window, the total rate for placing reservations at the first lodging location for each night in the block is calculate. The total rate for each block comprises the sum of the lowest lodging rate for each night in the block. The plurality of blocks in the window that has the lowest total rate is identified. A recommendation to place a reservation at the first lodging location for each night in the identified block with the lowest total rate is then displayed to the consumer.

In some embodiments of the method, the identification of a block within the window can be based also on the cost of one or more other travel related expenses on one or more days encompassed by a block. The other travel related expenses can include flights, rental vehicles, tickets to attractions, etc.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 1 illustrates a difference between lowest travel rates according to traditional methods in comparison to travel rates according to embodiments of the invention;

DETAILED DESCRIPTION OF THE INVENTION

Figure 2:
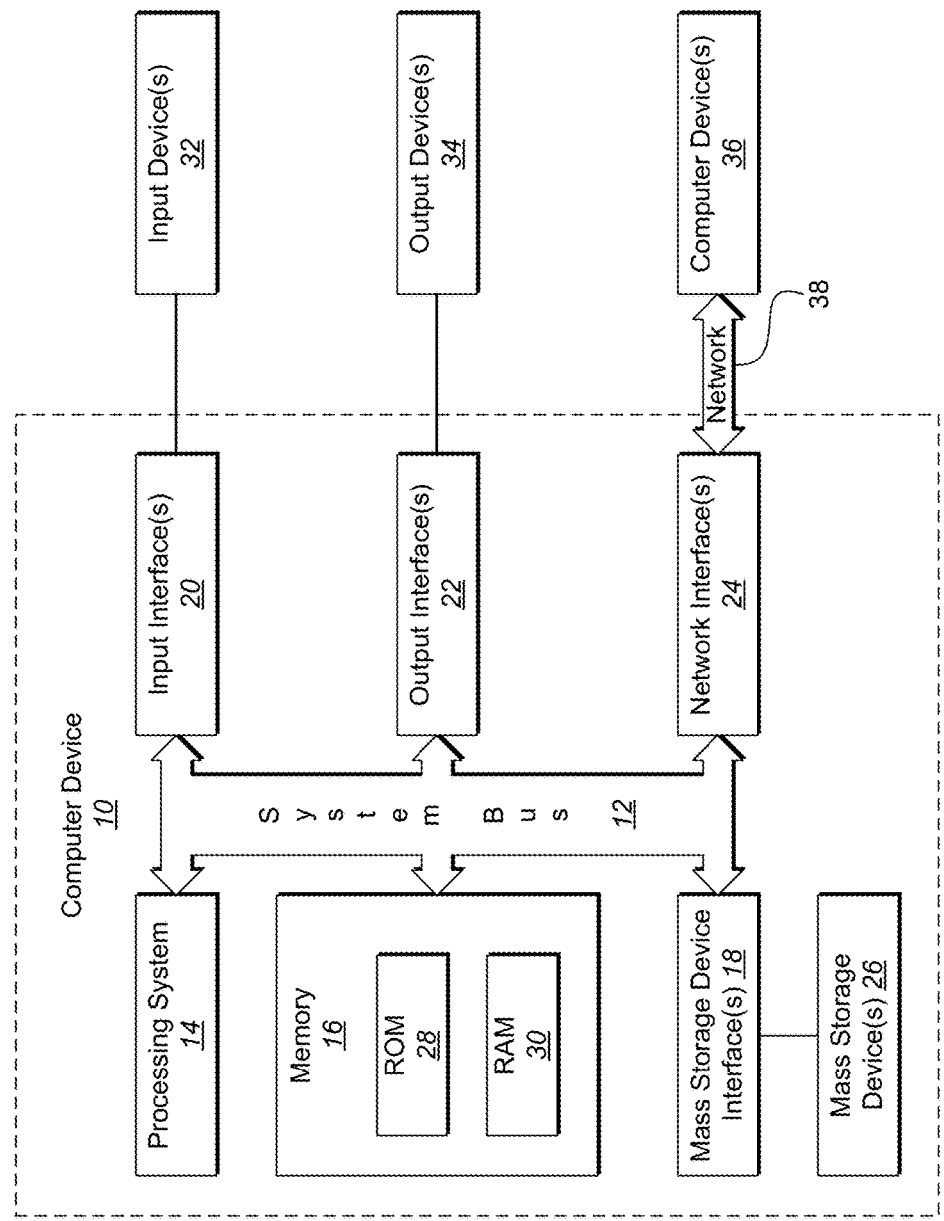
FIG. 2 shows a representative computer environment for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provides systems, methods, and non-transitory computer readable media storing computer program code instructions to cause a computer to execute methods of obtaining a lowest rate on a multi-night lodging stay. In accordance with embodiments of the invention, a method for obtaining a lowest rate on a multi-night lodging stay includes obtaining lodging rate information for a first lodging location from a plurality of lodging rate sources and receiving, from a consumer, information defining a desired multi-night lodging stay at the first lodging location. The method also includes comparing the information defining the desired multi-night lodging stay to the lodging rate information from the plurality of lodging rate sources to locate a lowest lodging rate for each of the nights of the desired multi-night lodging stay and generating a plurality of lodging reservations corresponding to the multi-night lodging stay, wherein at least two of the lodging reservations correspond to different nights of the multi-night lodging stay and are placed through different lodging reservation systems.

Obtaining lodging rate information may include automatically conducting rate searches at the plurality of lodging rate sources when the information defining a desired multi-night lodging stay is received from the consumer, conducting rate searches at the plurality of lodging rate sources prior to receipt of information defining a desired multi-night lodging stay and storing the lodging rate information in a database of rate information and obtaining lodging rate information from each lodging rate source corresponding to a plurality of all permutations of stays of varying lengths within the desired multi-night lodging stay to locate any special rates available for multi-night less stays no longer than the desired multi-night lodging stay. Comparing the information defining the desired multi-night lodging stay to the lodging rate information may include selecting a first night of the multi-night lodging stay, determining a lowest available lodging rate for the first night through each of the information sources, selecting an information source having the lowest lodging rate for the first night, and repeating the steps of selecting a night, determining the lowest available rate, and selecting an information source having the lowest lodging rate for each night of the desired multi-night lodging stay.

The method may also include updating the lodging rate information from the plurality of lodging rate sources throughout a period of time during which any of the plurality of lodging reservations is subject to cancellation, automatically comparing current rate information to rates of the plurality of lodging reservations, and when a current rate for a given night is less than a rate at which the given night was reserved: automatically canceling an original reservation for the given night and automatically making a new reservation for the given night at the current rate. The new reservation may be made through a different lodging reservation system than the original reservation or through the same lodging reservation system.

The method may also include obtaining lodging rate information for a second lodging location in geographic proximity to the first lodging location from at least one lodging rate source and comparing the lodging rate information for the second lodging location with the lodging rate information for the first lodging location, wherein the plurality of lodging reservations comprises lodging reservations of at least one night at the first lodging location and of at least one night at the second lodging location.

The method may further include providing a notice to the consumer that a lowest possible rate may require switching rooms during the multi-night lodging stay and receiving an action from the consumer indicating a willingness to accept the possibility of having to switch rooms during the multi-night lodging stay.

According to embodiments of the invention, a method for obtaining a lowest rate on a multi-night lodging stay includes obtaining lodging rate information for a first lodging location from a plurality of lodging rate sources, receiving, from a consumer, information defining a desired multi-night lodging stay at the first location, and comparing the information defining the desired multi-night lodging stay to the lodging rate information from the plurality of lodging rate sources to determine a source of a lowest lodging rate for each of the nights of the desired multi-night lodging stay. The method also includes assembling a lodging reservation itinerary comprising multiple independent lodging stays of one or more nights forming in sum an itinerary covering the desired multi-night lodging stay, calculating a total price of the lodging reservation itinerary, displaying the total price of the lodging reservation itinerary to the consumer as a lowest possible rate on the desired multi-night lodging stay, and generating a plurality of lodging reservations corresponding to the multi-night lodging stay, wherein at least two of the lodging reservations correspond to different nights of the multi-night lodging stay and are placed through different lodging reservation systems.

According to implementations of the invention, a method for determining which of a plurality of blocks of nights within a window of nights will have the lowest rate for a multi-night lodging stay comprises receiving, from a consumer, a request to identify the lowest rate for a multi-night lodging stay at a first lodging location. The request identifies a number of nights for the multi-night lodging stay and a window of nights during which the consumer is available to stay at the first lodging location. The window encompasses more nights than the number of nights identified in the request such that a plurality of different blocks of consecutive nights exist within the window. Lodging rate information for the first lodging location for each of the nights in the window is automatically obtained. The lodging rate information is obtained from a plurality of lodging rate sources. The lodging rate information obtained from each of the plurality of lodging rate sources is compared to identify a lowest lodging rate for each night in the window. For each different block in the window, the total rate for placing reservations at the first lodging location for each night in the block is calculate. The total rate for each block comprises the sum of the lowest lodging rate for each night in the block. The plurality of blocks in the window that has the lowest total rate is identified. A recommendation to place a reservation at the first lodging location for each night in the identified block with the lowest total rate is then displayed to the consumer.

In some embodiments of the method, the identification of a block within the window can be based also on the cost of one or more other travel related expenses on one or more days encompassed by a block. The other travel related expenses can include flights, rental vehicles, tickets to attractions, etc.

FIG. 1 illustrates a simplified comparison between methods in accordance with embodiments of the invention (at bottom) and previous methods (at top). According to previous methods, a consumer might conduct searches through various travel providers for lodging accommodations for a proposed multi-night stay. In this example, the consumer might want to stay at the MGM Grand for five nights from Tuesday through Saturday nights. Thus, the user might search through MGM's own search tools, as well as through the search tools of two OTAs, OTA 1 and OTA2. In the given example, each search would return a rate for the proposed total itinerary. The rate quoted to the consumer by the various travel providers is arrived at by the various nightly rates available through each provider, but the consumer is not made aware of the individual nightly rates forming the itinerary quote, and is forced to select the lowest total quote without knowing whether there was a way that the consumer could have achieved a lower overall rate. In this simplified example, the nightly rate for a particular night through any provider can range from one to four cost units. The total cost for the proposed five-night itinerary is fourteen cost units direct from the MGM, thirteen cost units through OTA 1, and twelve cost units through OTA 2, so the consumer selects to purchase through OTA 2.

Because the consumer did not have access to the individual nightly rates available through each provider and because the consumer could not make reservations for each night individually through multiple providers, the consumer is still forced to pay more than he or she has to. According to embodiments of the invention, a service provider determines individual nightly rates available from multiple travel providers, and assembles a composite itinerary to be reserved or booked through multiple of the travel providers. Thus, in the given example, the system determines that on Tuesday, OTA 2 has the lowest rate, on Wednesday, OTA 1 has the lowest rate, on Thursday, the lowest rate is available through the MGM directly, on Friday OTA 1 again has the lowest rate, and on Saturday OTA 2 has the lowest rate.

By assembling a composite itinerary selected from multiple providers, the system is able to provide significant savings to the consumer. In this example, a composite itinerary formed of five separate reservations made through three different travel providers saves the consumer approximately twenty-five percent, costing the consumer only nine cost units in comparison to the lowest rate available through OTA 2 of twelve cost units. Additionally, the consumer has only to conduct a single search through the service provider rather than conducting multiple searches through numerous OTAs and other travel providers to try to locate the best results.

As embodiments of the invention may be implemented in a variety of computer systems, FIG. 2 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), standalone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 2, a representative system for implementing embodiments of the invention includes computer device 10, which may be a general-purpose or special-purpose computer or any of a variety of consumer electronic devices. For example, computer device 10 may be a personal computer, a notebook computer, a laptop, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 3:
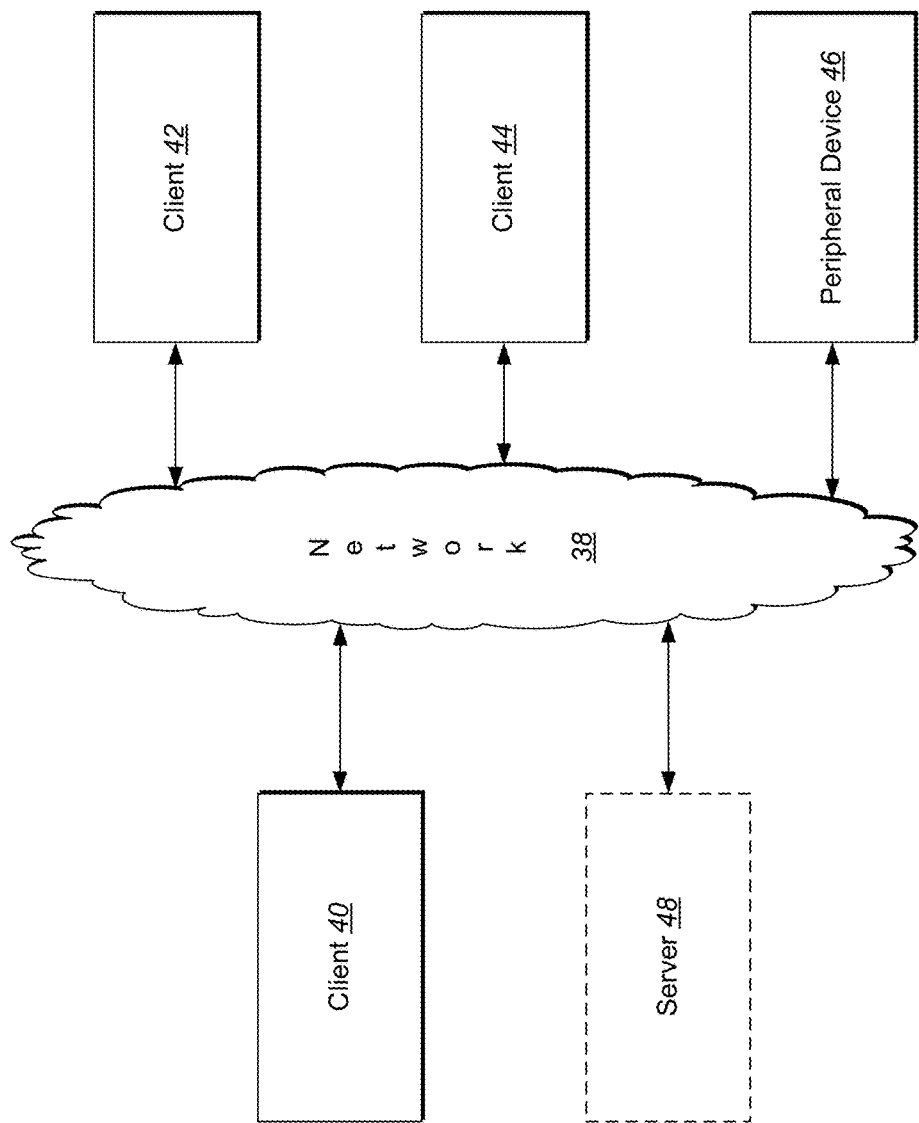
FIG. 3 shows a representative networked computer environment for use with embodiments of the invention.

Thus, while those skilled in the art will appreciate that embodiments of the present invention may be practiced in a variety of different environments with many types of system configurations, FIG. 3 provides a representative networked system configuration that may be used in association with embodiments of the present invention. The representative system of FIG. 3 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 3 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 3, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 4:
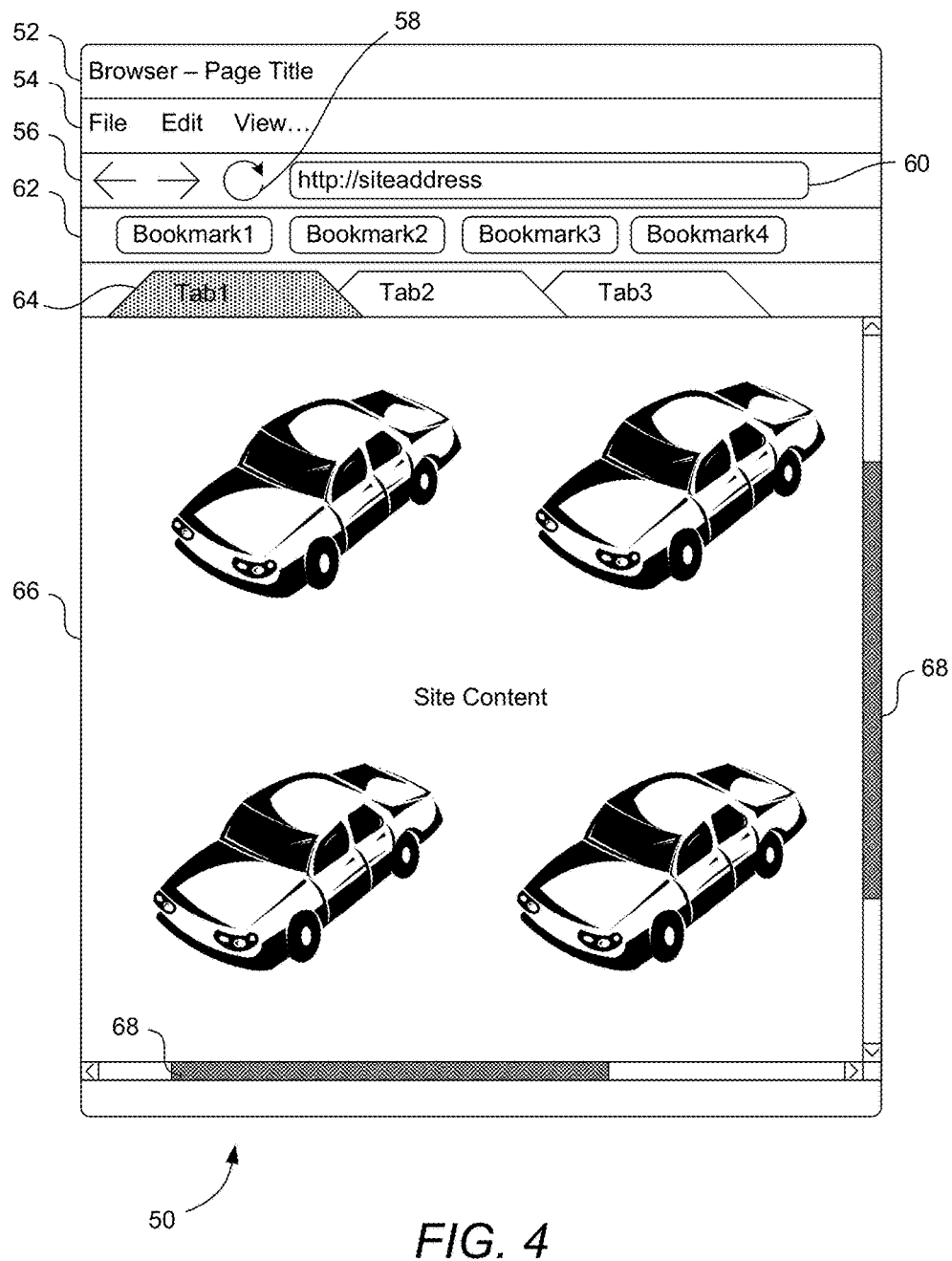
FIGS. 4-6 show representative browser windows illustrating manners of providing features of embodiments of the invention.

To minimize the need to download and/or install programs on users' computers, embodiments of the invention utilize existing web browser technology. Many browser programs currently exist or are under development for a variety of platforms, and it would be impossible to name all such browser programs, but examples of such programs include Microsoft's Internet Explorer, Mozilla Firefox, Google Chrome, Apple Safari, Opera Software's Opera browser, as well as myriad browsers specifically configured for specific devices, such as Internet-connected smart phones and the like. While the exact display of each browser can vary from browser to browser and while most are moderately to highly configurable so as to vary the exact display, FIG. 4 shows a representative browser window 50 similar to what might be displayed on a user's computer device. It will be appreciated that many of the features described below with respect to the illustrated browser window 50 are optional or are optionally displayed or hidden as desired by the user, but each feature is typical or illustrative of features common to many browser programs.

The browser window 50 of FIG. 4 includes a title bar 52. The title bar 52 often is used to display a page name of whatever page is actively being viewed. Most commonly, the page name that is displayed is selected by the administrator of the website being viewed, and the page name often includes one or more phrases associated with the administrator of the website and/or the page being viewed. The browser window 50 also includes a menu bar 54 that includes items that may be selected to provide access to various menu functions, as is well known in the art. Of course, the menu functions provided in the menu bar 54 may vary according to the specific browser program, among other considerations, and access to menu functions may be provide other than by a menu bar similar to menu bar 54, such as by selection of certain keystrokes.

The browser window 50 of FIG. 4 also includes an address bar 56, which in the browser window 50 shown in FIG. 4 includes several browser controls 58 and an address entry area 60. The browser controls 58 and the address entry area 60 facilitate browsing using the window, permitting the user, for example, to go back one or more pages, to go forward one or more pages, to refresh a page, and/or to type in a destination site's address to directly access a page. Such browser features are well known in the art and need not be further discussed.

The browser window 50 also includes a bookmark bar 62 that a user can populate with bookmarks to commonly-accessed web pages, such that the user can quickly re-access the page(s) by clicking on the relevant bookmark button. In most common browser programs, it is possible for the user to have several different websites open simultaneously, and for the browser to provide rapid access, switching between, and management of the various open sites by way of various tabs 64, as shown in FIG. 4. Each tab 64 provides access to one open website. The tabs 64 facilitate navigation between different open websites. The contents of each open and actively-viewed website may be displayed in a content area 66. Thus, the content displayed in the content area 66 may vary depending on which tab 64 is selected, and which website is being viewed.

Whereas the tabs facilitate navigating between different websites, the browser window 50 optionally includes features to facilitate navigating within a website, as is known in the art. Specifically, the browser window may optionally include one or more scroll bars 68. When a portion of the website being viewed lies outside of the viewable portion of the content area 66, the user may use the scroll bars 68 to access non-visible portions, as is known in the art.

Many currently-available browser programs permit the installation of additional features, such as through what are commonly known as "browser extensions." Browser extensions are becoming more and more common in today's browser programs, and have become one of if not the standard for extending the functionality of the browser programs. For browsers that do not currently support browser extensions, other mechanisms and installed programs are often available to provide similar functionality. For example, on many handheld consumer devices such as smart phones and tablet computers, apps may be used to provide certain functionality to the devices. Embodiments of the invention may utilize browsers, browser extensions, standalone programs, apps, and any other mechanism to provide desired functionality.

Embodiments of the invention utilize a browser extension or similar format to provide functions in accordance with embodiments of the invention. The use and installation of a browser extension is typically significantly less involved and less computer-intensive than the use and installation of a standalone program. In many instances, the installation of the browser extension occurs essentially without the computer's operating system being made aware of any additional installation. Instead, the browser program itself handles the browser extension and any demands made by the browser extension.

Figure 5:
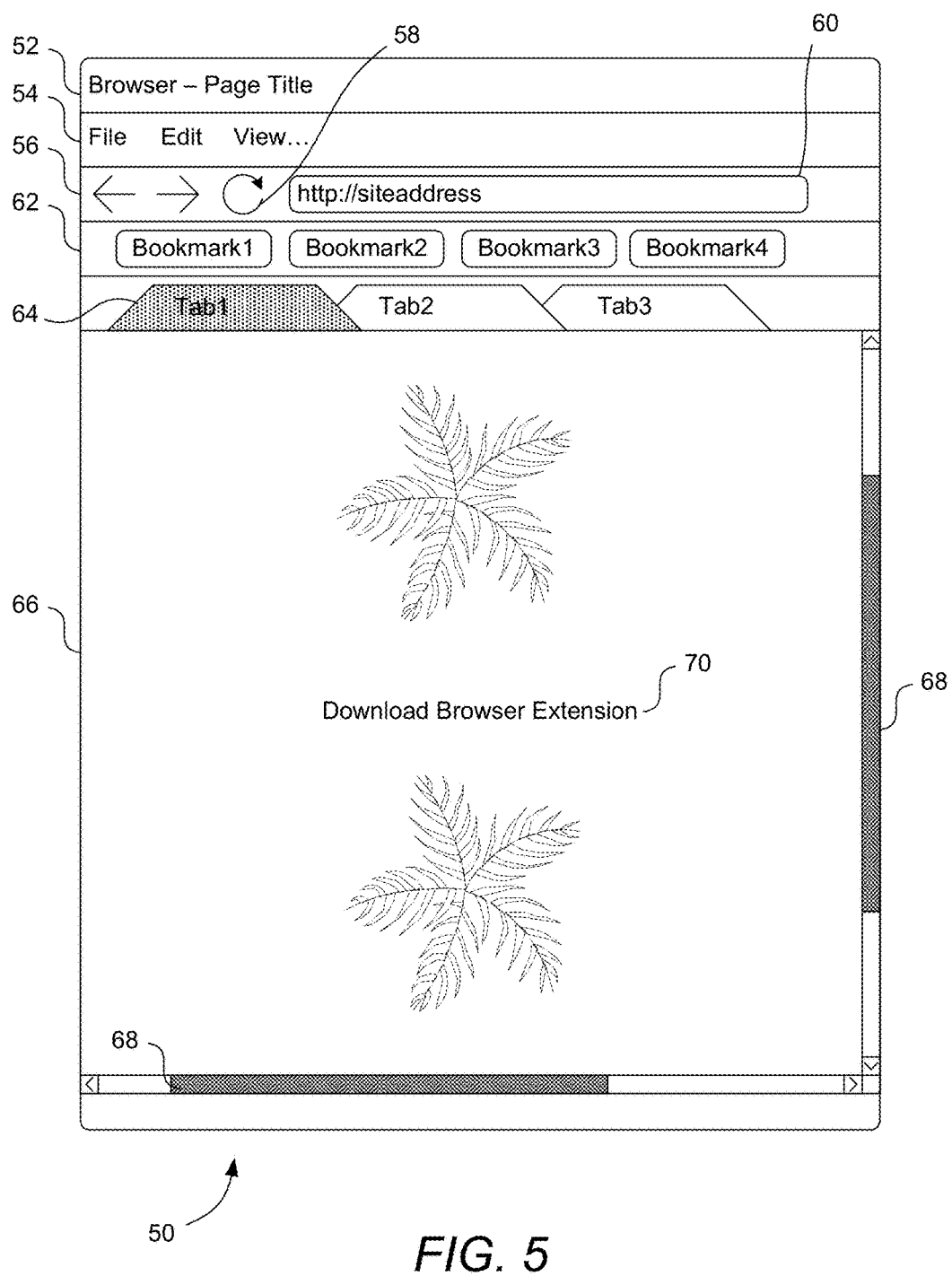
Figure 6:
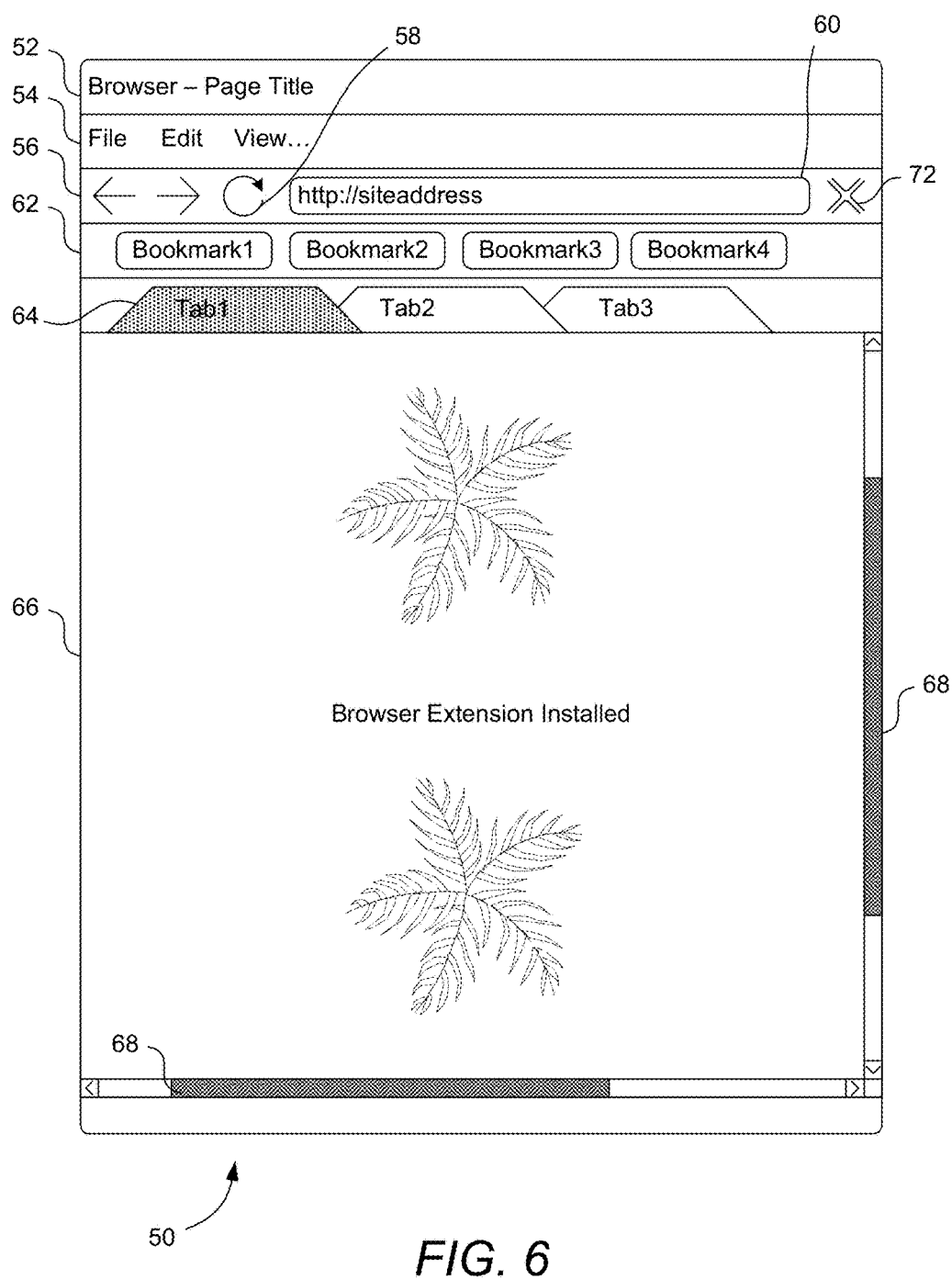

A browser extension in accordance with embodiments of the invention, for example, may be rapidly and easily installed, such as by visiting a download website. An example of such a website is shown in FIG. 5. A user desiring to obtain functionality associated with embodiments of the invention may visit a website such as that illustrated in FIG. 5, and may select an installation link 70. Upon selection of the installation link 70, the user may be prompted to confirm in one or more steps that he or she wishes to download and install the browser extension. If the user confirms that the browser extension is to be downloaded and installed, the download and installation is completed. A similar installation process may be used to install a standalone program or an app, where such a mechanism is used to provide access to the features of embodiments of the invention discussed herein.

Where a browser extension is used, access to the browser extension may be provided according to any method known in the art, but one example is shown in FIG. 6, in which it can be seen that a browser extension icon 72 has been added to the address bar 56. Of course, where an icon such as the browser extension icon 72 is provided, it may be provided at any desirable location or on any desirable toolbar, including a new toolbar, within the browser window 50. Additionally, features provided by the browser extension may alternatively be accessed by one or more menu functions accessed through a browser menu or any other similar mechanism, as well as by any means or mechanism for accessing such functions now known in the art or later created.

Once the browser extension has been installed (which is a relatively easy process as described above), the browser program and the browser extension may be used to provide functions in accordance with embodiments of the invention. While the specific functionality of the browser extension may be varied in essentially infinite ways while maintaining the functionality that will be discussed herein, including customizations for each user to facilitate each user's access, a description of ways in which that functionality may be provided is given below.

According to embodiments of the invention, a service provider utilizes computer systems such as those described above with respect to FIGS. 2-6 to locate most economical travel deals for a consumer and to present the most economical options to the consumer. The service provider acts a second-tier OTA, aggregating information from a plurality of first-tier OTAs, searching through the information and options to select the most economical alternatives, presenting the alternatives to the consumer, and booking appropriate reservation(s) based on the consumer's selection of a desired alternative. The functions and concepts provided by embodiments of the invention may be applicable to minimizing costs of any aspect of travel, but as embodiments of the invention are particularly useful in minimizing lodging costs, the following discussion will focus primarily on utilizing embodiments of the invention to obtain most economical lodging costs for a consumer. It will be understood that where the principles discussed with respect to lodging are applicable to other travel costs, they could be applied to minimization of other travel costs.

Existing OTAs commonly utilize contracts with providers of lodging (e.g. a hotel, a hotel chain, a motel, a motel chain, a bed and breakfast, etc.) to obtain favorable rates for the customers of the OTAs. The contracts between each lodging provider and each OTA may differ in details. For example, a lodging provider may contract a first particular block of rooms for one OTA and a second particular block of rooms for a second OTA. One of the two blocks of rooms may have certain benefits or other characteristics, such as a better view, or proximity to or distance from an elevator, floor of the facility, bed configuration, other amenities, and the like, and the benefits or characteristics may impact the contract rate negotiated between the lodging provider and the OTA.

Additionally, the per-room and per-night minimum rate contracted with the OTA may vary by date and/or day of the week, with higher-demand dates or days of the week fetching a higher rate than lower-demand dates or days of the week. The particular days or dates that may have a higher rate may vary based on a variety of known factors, such as whether the lodging facility is targeted to business travelers versus leisure travelers and the like. In certain cases, the lodging provider may provide discounts on certain rates at certain times, and may not provide such discounts equally to all OTAs. Discounts may be provided due to available vacancies, booking stays extending more than one night, or any of a variety of other factors.

The result of all of the above factors is that a consumer seeking to get the lowest rate cannot rely on a search through a single OTA to guarantee getting the lowest possible rate for a planned stay. Furthermore, even if the consumer takes the time to search through multiple OTAs, the consumer still may not locate the lowest possible rate for a planned stay. Factors interfering with obtaining the lowest possible rate include the differences in contracts between the various OTAs and the lodging providers, changes in rates over time, differences in prices between lodging providers within reasonably close proximity to a desired location, differences in lodging providers contracting with OTAs, and the like. Some consumers, when faced with the difficulty in trying to obtain the lowest possible rate simply give up and accept the lowest rate they have located at the point of giving up.

Figure 7:
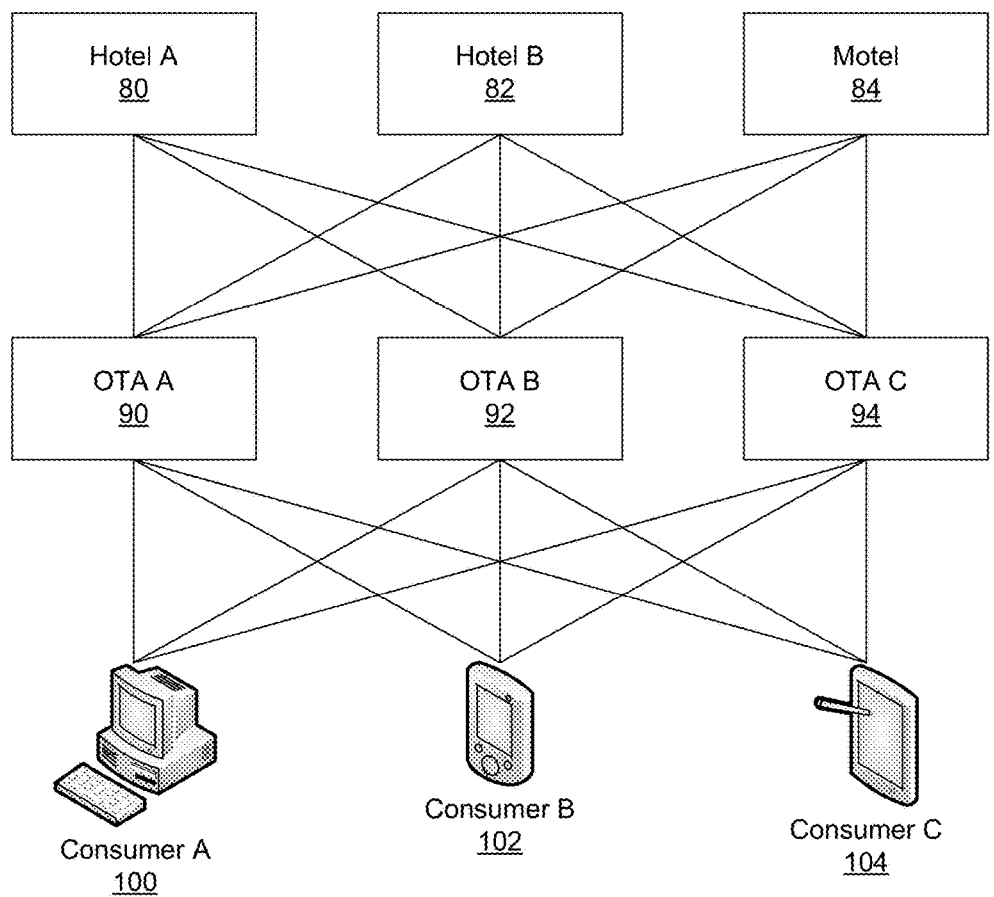
FIG. 7 shows a logical connection chart between various parties involved in seeking and reserving lodging accommodations.

FIG. 7 illustrates the complications consumers face when trying to locate the lowest possible rate for lodging. If there are three possible places to stay near a desired location, Hotel A 80, Hotel B 82, and Motel 84, the consumer may wish to consider all three lodging providers as possible locations to stay at. The consumer may know of three OTAs on which to search, OTA 90, OTA 92, and OTA 94, and may wish to conduct searches of all three OTAs. Each of the OTAs may or may not have contracts with each of the lodging providers governing the available rooms and rates. If all the OTAs have contracts with all the lodging providers, that means that there are a total of nine contracts governing rates between lodging providers and OTAs in just this simple example. Meanwhile, the consumer must visit the websites of all three OTAs to locate the best rate. If there are multiple consumers seeking best available rates, such as Consumer A 100, Consumer B 102, and Consumer C 104, each of them has to conduct their searches on each of the websites of the various OTAs.

If Consumer A 100 has a planned itinerary and room type preference conducts searches at a certain time on a certain day, he or she will likely discover certain rates through OTA A 90, OTA B 92 and OTA C 94. If Consumer A is seeking the best available rate, he or she will select the best rate available from among the rates displayed by the three OTAs without ever really knowing why that OTA's rate is the lowest or what factors and per-night rate components led to that rate being available. Consumer A simply knows that he or she has selected the best rate available. Meanwhile, Consumer B 102 might have an identical itinerary and room type preference, but might conduct the search a few days later, when one of the lodging providers has discounted its rates to maximize occupancy. Consumer B 102 conducts identical searches as did Consumer A 100, but because of the discount locates and is able to book at a lower rate than did Consumer A 100. Finally, Consumer C 104 might also have an identical itinerary and room type preference, but might conduct the search a few days later still. Unknown to Consumer C 104, the lowest-rate rooms of the lodging provider with the lowest rates is fully booked for the first few days of Consumer C's planned stay, so the apparent lowest rate shown to Consumer C 104 for his or her planned stay ends up being significantly higher than the rates of Consumer A 100 and Consumer B 102.

Meanwhile, none of Consumer A 100, Consumer B 102, or Consumer C 104 is really able to be sure that he or she has obtained the lowest rate possible. The consumers are unable to more fully investigate and understand the various components of the rates for their stay, and even if they could, they probably would not want to do the work necessary to understand what would be necessary to fully understand and obtain the lowest possible rate. Embodiments of the invention address these problems and assist the consumer in achieving the lowest possible rates for travel lodging.

One of the problems hindering the consumer is the varying contracts negotiated by the various OTAs. According to the contracts between the OTAs and the lodging providers, the OTAs and lodging providers negotiate what may be termed an "opaque rate," which is the lowest actual rate at which a particular room or class of room may be rented on a particular date. The opaque rate, however, is typically not advertised or at least not openly advertised by the OTAs. Instead, the OTAs may show, for example, rates according to a full length of stay only. As another example, an OTA may show the opaque rate for a particular lodging provider, but may be prohibited from displaying identifying information about the provider—instead, the OTA advertises, for example, that a four-star hotel is available in a certain region for a certain price (which is the opaque rate), and the consumer has to commit to the reservation on faith before knowing what the lodging provider facility actually is.

To illustrate possible savings that the consumer misses using traditional methods, Table 1 shows a representative comparison of the nightly opaque rate at a certain point in time between the various OTAs for a single lodging facility and class of room over the course of a representative week.

TABLE 1

| Night | OTA A Rate | OTA B Rate | OTA C Rate | Lowest Daily Rate |
|---|---|---|---|---|
| Sunday | 420.00 | 409.00 | 420.00 | 409.00 |
| Monday | 125.00 | 132.00 | 125.00 | 125.00 |
| Tuesday | 125.00 | 132.00 | 125.00 | 125.00 |
| Wednesday | 125.00 | 110.00 | 125.00 | 110.00 |
| Thursday | 125.00 | 110.00 | 125.00 | 110.00 |
| Friday | 325.00 | 340.00 | 340.00 | 325.00 |
| Saturday | 310.00 | 310.00 | 300.00 | 300.00 |
| Total for Week | 1,555.00 | 1,543.00 | 1,560.00 | 1,504.00 |

When the consumer conducts his or her searches, the various OTAs will typically only display the weekly rate, not the various nightly rates that make up the weekly rate. As may be seen from Table 1, the consumer conducting the search may therefore assume that the lowest possible weekly rate is available through OTA B, saving twelve dollars over OTA A's best rate and seventeen dollars over OTA C's best rate. The consumer would then typically make a reservation through OTA B. What the consumer does not and cannot know is that if the consumer were able to access the lowest opaque nightly rate selected from among the various OTA's options (shown in the "Lowest Daily Rate" column), the consumer would be able to save even more, saving thirty-nine dollars over OTA B's best rate. Embodiments of the invention allow the consumer to recognize additional savings such as these.

Figure 8:
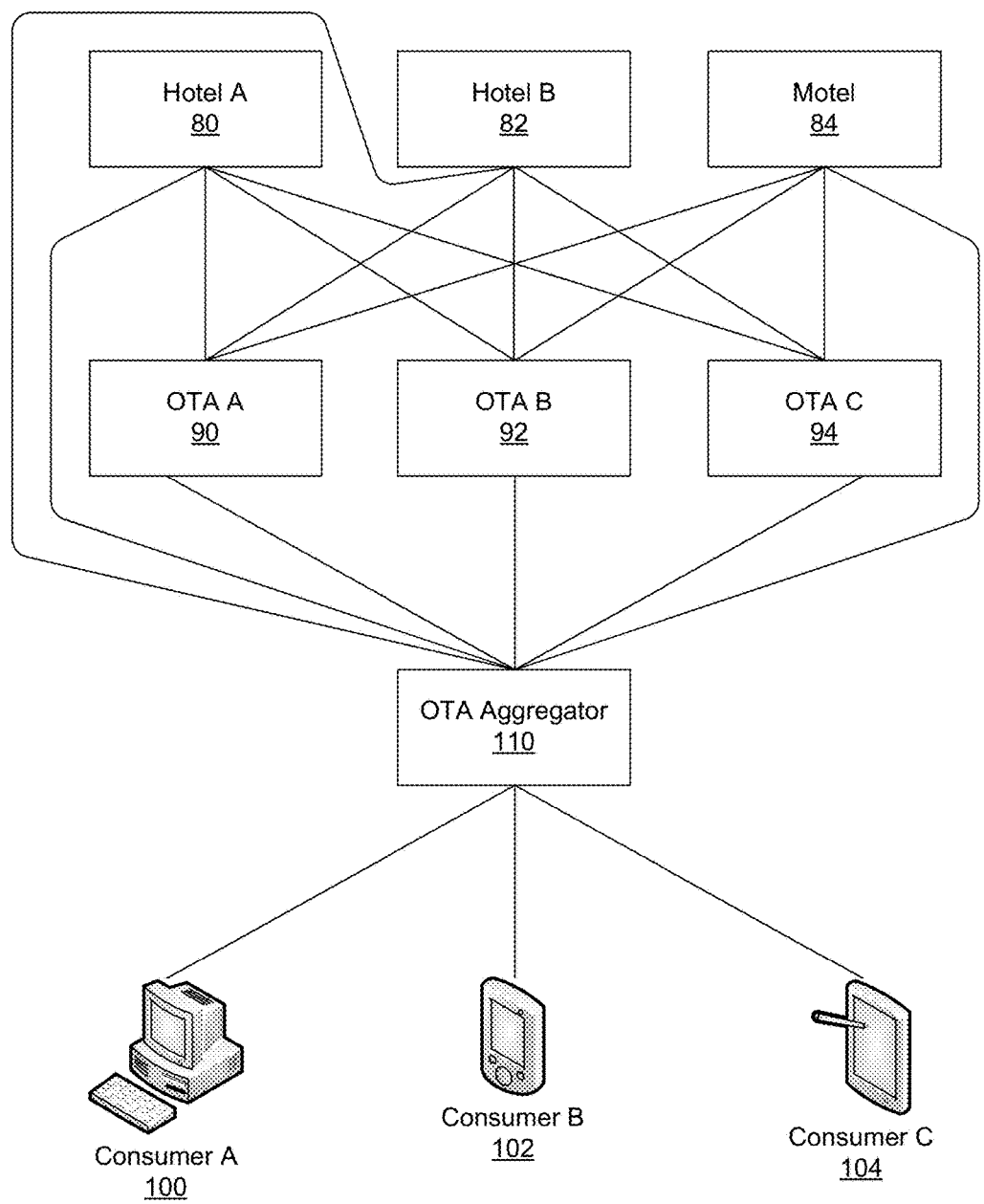
FIG. 8 shows a logical connection chart between various parties involved in an improved process for seeking and reserving lodging accommodations.
Figure 9:
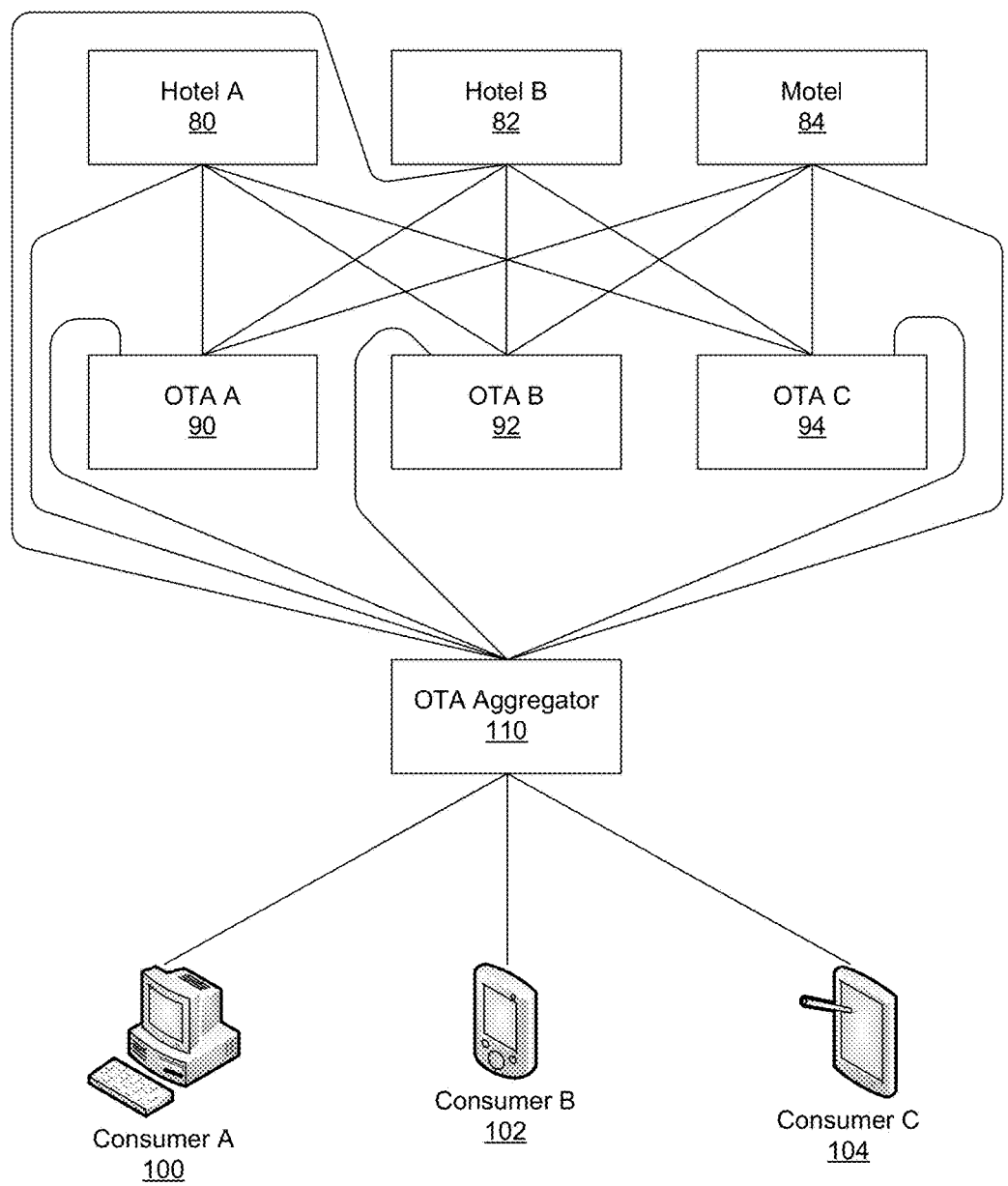
FIG. 9 shows an alternative logical connection chart between various parties involved in an improved process for seeking and reserving lodging accommodations.

FIGS. 8 and 9 illustrate how embodiments of the invention may be utilized to help overcome the difficulties consumers face when dealing with existing OTAs. According to embodiments of the invention, and OTA aggregator 110 acts as an intermediary between the consumers and the OTAs. Unlike existing aggregators, the OTA aggregator 110 does more than simply repeat the consumers' queries to each of the OTAs and list or otherwise provide the results for the consumers. Instead, the OTA aggregator 110 accesses and processes additional data to ensure that the consumer obtains the lowest possible rate and takes all necessary action to make the necessary reservations to achieve the lowest possible rate.

The OTA aggregator 110 may access information from the various OTAs in one of several ways, including using an application program interface (API). In a first option illustrated in FIG. 8, the OTA aggregator 110 accesses each of the OTAs in the traditional fashion, through what may be termed the "front end" of the OTAs, which is essentially the same mechanism provided to consumers. In other words, the OTA aggregator 110 obtains information in this example through essentially a similar process as the consumer would, though automated, by submitting queries to the respective OTAs and compiling the results. The specific queries, however, would be significantly different from those a consumer might normally submit, and the OTA aggregator typically submits more queries than the ordinary consumer might submit so as to better approach the opaque rates for each OTA. The queries will be discussed in more detail below.

In a second option illustrated in FIG. 9, the OTA aggregator 110 accesses each of the OTAs through what may be termed a "back end" of the OTAs. This option is achieved through an agreement between the OTA aggregator 110 and each of the OTAs, such that the OTAs grant the OTA aggregator 110 more direct access to information such as the opaque rate and other minimum rate data without requiring that the OTA aggregator 110 conduct multiple searches through the front end to obtain such rate information. The OTAs grant increased access because when the OTA aggregator 110 completes a sale to/reservation on behalf of the consumer, the OTA aggregator 110 books through the OTAs, and the OTAs therefore obtain their commissions granted by the lodging providers.

Regardless of whether the OTA aggregator 110 obtains information through the front end as in FIG. 8, through the back end as in FIG. 9, or through some combination of the two (such as where some OTAs grant back-end access and others do not), the OTA aggregator 110 obtains the lowest possible rate for the consumer by considering the possibility of reducing rates for a multi-night stay through multiple bookings across multiple OTAs (which may also include direct bookings with the lodging providers).

To illustrate, the example of Table 1 may be reconsidered. In that example, a consumer seeking a seven-night stay could conduct searches at the various OTAs individually, and would obtain a weekly rate quote of $1,555.00 at OTA A 90, of $1,543.00 at OTA B 92, and of $1,560 at OTA C 94. As before, the consumer cannot know that different OTAs have different lowest rates on different nights of the planned stay. The OTA aggregator 110, however, obtains this information and uses it to obtain the lowest possible rate for the consumer.

The OTA aggregator 110 obtains the opaque rate, or lowest possible nightly rate for each of the OTAs for each night of the proposed stay. Where the OTA aggregator 110 has direct access to this information through the OTA back end (FIG. 9), the OTA directly obtains this information. Where the OTA aggregator 110 does not have back end access, the OTA aggregator 110 automatically runs queries of the various OTAs through the front ends of the OTAs to discover the lowest nightly rates available through each OTA for each night of the proposed stay. For example, the OTA aggregator 110 may run multiple one-night stay queries throughout the planned stay period for each of the OTAs and accumulates that data for comparison of lowest rates. The OTA aggregator 110 may also run query permutations to determine if lower rates are available for multiple-night stays. Thus, if the planned stay is seven nights, the OTA aggregator 110 may run queries for each night as a single night stay, queries for each possible two-night block, queries for each possible three-night block, queries for each possible four-night block, queries for each possible five-night block, queries for both possible six-night blocks, and a query for the entire period. These queries allow the OTA aggregator 110 to be sure it has acquired all lowest-possible rate data.

Once the OTA aggregator 110 has obtained the lowest possible rate data, it determines what combination of bookings through the various OTAs will obtain the lowest possible weekly rate for the consumer and displays this rate to the consumer. Turning to the Example of Table 1 in its simplest form, if the OTA aggregator 110 determined that one-night bookings were the least expensive for every night through each OTA, the OTA aggregator 110 would determine that the lowest possible rate could be obtained as follows: Monday night through OTA B 92, Tuesday night through OTA A 90 or OTA C 94, Wednesday night and Thursday night through OTA B 92, Friday night through OTA A 90, and Saturday night through OTA C 94. When the consumer elects to book at the lowest possible rate, the OTA aggregator then makes appropriate bookings or reservations through the appropriate OTAs.

In the foregoing example, the consumer would then have a total of five different bookings through three different OTAs. The OTA aggregator 110 may seek to facilitate the best experience possible for the consumer in several ways.

First, the OTA aggregator 110 may utilize a common reservation number across all bookings, so the consumer need only know a single reservation number. The OTA aggregator 110 handles communication with the consumer in a fashion similar to that known in the art, such as by delivering a reservation e-mail or text message to the consumer with the applicable reservation number. Next, the OTA aggregator 110 may contact the lodging provider directly to confirm that the lodging provider received the various reservations/bookings. Some lodging providers utilize older reservation systems, for example facsimiles from the OTAs, and the contact from the OTA aggregator 110 ensures that the consumer does not arrive at the lodging provider to discover the reservation was not entered into the lodging provider's systems. The OTA aggregator also notifies the lodging provider that the various reservations or bookings all correspond to the same single reservation or booking so the lodging provider can plan accordingly to deliver the best customer service experience to the consumer.

As may be appreciated from the foregoing description, where multiple bookings or reservations are made through multiple OTAs, the various bookings or reservations may theoretically apply to different rooms. As discussed above, for example, the lodging provider may have contracted with OTA A 90 for a certain block of rooms and with OTA B 92 for a second block of rooms. When reservations are made through multiple OTAs that theoretically apply to different rooms, one or more of several actions may occur. First, the consumer may be clearly notified in advance that the proposed price may involve one or more changes of room during his or her stay. If the consumer wishes not to accept the possibility of a room change, the OTA aggregator 110 may take one of several actions. As one example, the OTA aggregator 110 may contact the lodging provider directly to determine whether the lodging provider will be able to accommodate the multiple bookings or reservations as for a single room. Lodging providers are typically motivated to keep guests in a single room as that usually lowers the cost of cleaning the rooms and soiled linens/towels and also improves customer relations. Thus, even if the consumer accepts the possibility of a room change or if the lodging provider may not theoretically maximize the possible rental rates if the consumer stays in a single room, the lodging provider may well leave the consumer in a single room.

As another example, if the consumer takes an action indicative of unwillingness to accept the possibility of a room change, the OTA aggregator 110 may recalculate the lowest possible rate that can be achieved with a single booking. The OTA aggregator 110 then presents this new lowest rate to the consumer. When presented with the difference, many of the most cost-conscious consumers may reconsider accepting the possibility of a room change to get the lowest possible rate. Regardless, the consumer still gets the lowest possible rate he or she is willing to accept for the convenience wanted or the possible inconvenience he or she will tolerate. In some embodiments, the OTA aggregator 110 may simultaneously display the rate with the possibility of one or more room reassignments alongside the rate without such a possibility, so the consumer can make an educated decision as to which rate to choose.

The possibility of a room change within a single lodging provider property and room level is one example of how a possible room change may provide value to a consumer. Other examples are incorporated into embodiments of the invention. As an example, a lodging provider may have rooms in two separate towers. Based on the information available to the OTA aggregator 110, it may know that if the consumer is willing to switch towers for the last night of a stay, the consumer could save hundreds of dollars. The OTA aggregator 110 may make the consumer aware of the potential savings and associated inconvenience, and could allow the consumer to decide whether the savings justifies the inconvenience.

As another example, the OTA aggregator 110 may determine that other nearby lodging providers have significantly lower rates for one or more nights of the consumer's proposed stay. This might occur, for example, when a first lodging provider is booked for a convention for one or more nights of the consumer's proposed stay, leading to increased rates for any convention nights. The OTA aggregator 110 may notify the consumer of available cost savings. The consumer could then determine whether a stay extending over more than one lodging provider property and requiring relocation between properties is justified by the available cost savings. For example, if the consumer wishes to stay at a particular lodging provider property to fully participate in a convention, he or she may not wish to consider switching properties. In contrast, a consumer on vacation at a certain beach may not mind switching to a different property with a similar star rating a few hundred yards down the beach.

As another example, the consumer may be willing to consider a different room type or class for one or more nights of the proposed stay. The consumer may originally search for sea view rooms at a lodging provider. The system may determine that on one or more nights the rate difference between available sea view rooms and available pool view rooms is significantly different. The system may then present the consumer with notification of the difference and may provide the consumer with an opportunity to accept rooms of a different type or class. In some instances, rooms that might typically be considered of a higher class or rate may actually have a lower rate through one OTA than rooms considered of a lower class or rate through another OTA. Embodiments of the invention may be able to capture all possible rate differences and make them available to the consumer.

As still another example, a certain room type may have certain days or dates of low availability and higher cost. At times, a certain room may have a high-rate period that may be as much as three to ten times the cost of a low-rate period. According to embodiments of the invention, the system may flag such occurrences and propose to the consumer that the consumer consider a different class of room (whether within the same property or at some other property) just for the night or nights of extraordinarily high cost of the originally-selected room class. As may be appreciated, any of the foregoing examples may be combined as appropriate to obtain a lowest possible rate for the consumer within the range of options the consumer is willing to consider.

In certain embodiments, options for reducing the consumer's rate on a multi-night stay may be presented in any of a variety of fashions. As one example, the consumer may be presented with a textual notice of options and may be provided with an opportunity to accept one or more options for consideration. As another example, the consumer may be presented with a notice of different minimum prices, such as in a grid or list view, each of the different minimum prices being impacted by various options. The options impacting each possible minimum price could be listed in proximity to the price or could be shown to the consumer upon selecting or hovering over the price or some other selector associated with each price. As another example, the consumer may be presented with an interface that allows the user to select or deselect certain available options at some point during the process, thereby affecting the range of rates displayed to the consumer. Any known graphical user interfaces may be used to present options to the user, including sliders, toggle switches, buttons, and the like.

The options presented to the consumer may vary from situation to situation. For example, a consumer might search for lodging accommodations at a certain selected property on the Strip at Las Vegas. The system may determine that the consumer might be willing to consider a mid-stay switch to another property because numerous other properties with similar star ratings are located within fairly close proximity to the originally-selected property. In contrast, a consumer might search for lodging accommodations at a certain selected property in a remote area that is effectively only served by a single lodging provider or property. In that case, the system may determine that it would be inappropriate to suggest or provide options for considering other properties as part of the search, as no reasonable substitutions would be expected.

To facilitate such considerations, the system may be programmed to recognize or determine situations in which various options may be applicable. For example, distances between various lodging properties may be input into the system, and a filter may be implemented that only provides certain options for considering additional properties when distances are within a certain range. Similarly, lodging property characteristics, such as whether a lodging property is beachfront, may be input into the system, and a filter implemented that only provides options for considering additional properties when additional properties are available by distance and also have certain shared characteristics with the originally selected property. Numerous other considerations may be similarly implemented.

Embodiments of the invention provide savings and information to the consumer in numerous ways in addition to those discussed above. Many OTAs have certain contractual obligations associated with their contracts with the lodging providers. For example, a common restriction placed on OTAs is that they can only advertise the average nightly rate of a proposed stay, not the individual nightly rates of each of the component nights of the stay. As discussed above, this limits consumers' ability to ensure they obtain the best rates on each night of their stays. Even where the OTA aggregator 110 is required to or voluntarily complies with the same or a similar restriction, the OTA aggregator 110 has first obtained the lowest possible rates on each night from the various OTAs and is able to compile a best possible rate, so that even when the OTA aggregator 110 only shows the average nightly rate, it may be significantly lower than that of any other OTA.

Additionally, the OTA aggregator 110 is able to continue to maximize the consumers' savings after the reservation/booking because of the piecemeal assembly of the stay from a variety of sources. Typically, once a hotel reservation is made, the consumer is able to cancel the reservation with a full refund up to a certain point in time. Once that point of time passes, the reservation generally cannot be canceled or cannot be canceled without payment of a significant fee or portion of the reservation cost. In many instances, once the consumer makes a reservation, he or she locks in a price and is not made aware of intervening price changes that could result in a significant cost savings if the consumer canceled a previous reservation and rebooked. Meanwhile, price changes in the industry can occur regularly without the consumer being able to take advantage of favorable changes.

According to embodiments of the invention, the OTA aggregator 110 takes advantage of the piecemeal assembly of the stay and the OTA aggregator's connection to multiple sources of information to continue seeking cost savings for the consumer, including even after a stay has commenced. In the foregoing discussion, the OTA aggregator 110 obtains information by conducting queries through the various OTAs' frontend or backend. The OTA aggregator 110 could also act as an OTA itself through a direct contract/connection with the lodging providers, thereby obtaining rates that may be better than those available through any other OTA. While the OTA aggregator 110 may make queries at the point in time the consumer conducts a search for a potential stay, the OTA aggregator 110 may also hasten processing of the consumer's search by pre-conducting queries at all available lodging providers, properties, room classes/options, etc. and by maintaining a database of rates.

The OTA aggregator 110 can re-conduct its queries from time to time to make sure that its database is up-to-date with the latest rate changes. Additionally, the OTA aggregator 110 may optionally receive push notifications from the OTAs and/or lodging providers directly of new rate changes, and can incorporate any changes in rates into its database. Where the OTA aggregator 110 does not maintain a full database of rates, it can at least maintain a mini-database of rates associated with bookings or reservations made by its customers through the OTA aggregator 110, and can update the mini-database through renewed queries or push notifications.

When the OTA aggregator 110 locates a lower rate than the booked/reserved rate on one or more nights of the consumer's reserved stay, the OTA aggregator 110 first determines whether any affected nights are still outside of the non-cancellation window. In some cases, the nights may still be cancelable even after the consumer has arrived at the lodging property and has begun his or her stay. If the nights are outside of the non-cancellation window, the OTA aggregator 110 may cancel any affected and cancelable nights and may make new reservations for the canceled nights. Alternatively, the OTA aggregator 110 may first make and confirm the new reservations and only then cancel any affected nights.

Because the original reservation was not made as a single reservation with a single OTA, the OTA aggregator 110 is able to take advantage of changing rates at any or all OTAs or with the lodging providers themselves to maximize consumers' savings in real time. Thus, the new reservation(s) may be through a different OTA than the original reservation(s), and the savings may be achieved in essentially real time as rates change. In some instances, a savings may be realized even when a cancellation occurs within a window requiring a fee. Thus, for example, if a cancellation of a night of a multi-night stay would incur a $50 cancellation fee, but would also provide over $50 in savings, the system may take advantage of the savings for the consumer. Regardless, the process is essentially an automatic benefit to the consumer with no action by the consumer required, except that the OTA aggregator 110 may notify the consumer and allow the consumer to accept or refuse the change where a new, lower, rate becomes available that would require either a room change not previously accepted or a property change not previously accepted, and the like. Potentially, the OTA aggregator 110 may retain for itself a portion of the benefit achieved as its commission for the service.

As another example of how embodiments of the invention maximize savings and information provided to the consumer, embodiments of the invention permit the OTA aggregator 110 to overcome some of the contractual limitations imposed on certain OTAs. For example, some OTAs agree to limit or hide certain information from the consumers. An OTA may hide the actual name of a property from frontend (e.g. consumer) access, only advertising that a certain class room is available at, say, a four-star hotel in a certain general location at a certain rate or that is available for a consumer to bid on or name his or her own rate, and may even display the minimum nightly rate because it is not showing the actual associated property name. The full information may be available through the OTA's backend, and the OTA aggregator 110 is able to use that information without breaking the contractual terms, as the OTA aggregator 110 only displays the information as part of an average nightly rate and/or a rate for the full stay.

Embodiments of the invention also avoid situations where other OTAs might return that no matching results are available, or that only a higher rate is available due to only a higher room class being available. For example, as discussed above, the contracts between the various OTAs and lodging providers may assign certain blocks of rooms to certain OTAs. Thus, even if a certain lodging provider may have rooms of a certain class available, it might not have rooms available through a certain OTA. Table 2 is a variation on Table 1 that illustrates this possibility.

TABLE 2

| Night | OTA A Rate | OTA B Rate | OTA C Rate | Lowest Daily Rate |
|---|---|---|---|---|
| Sunday | 420.00 | 409.00 | 420.00 | 409.00 |
| Monday | 125.00 | 132.00 | 125.00 | 125.00 |
| Tuesday | 125.00 | 132.00 | 125.00 | 125.00 |
| Wednesday | Unavailable | 110.00 | 125.00 | 110.00 |
| Thursday | 125.00 | 110.00 | 125.00 | 110.00 |
| Friday | 325.00 | Unavailable | 340.00 | 325.00 |
| Saturday | 310.00 | Unavailable | 300.00 | 300.00 |
| Total for Week | Unavailable | Unavailable | 1,560.00 | 1,504.00 |

In this example, OTA A does not have a room satisfying the consumer's query on Wednesday while OTA B does not have a room satisfying the consumer's query on Friday or Saturday. In those cases, the respective OTAs might be unable to return a satisfactory itinerary and will therefore indicate to the consumer that his or her requested itinerary is unavailable. Thus, absent the presence of the OTA aggregator 110, the consumer would be forced to make the reservation through OTA C, which was the most expensive OTA of the ones shown in Table 1. In an even more extreme example, rooms might be available all nights, but no OTA would individually have rooms available, and the consumer would be completely unable to make a reservation of the desired class of rooms through any available OTA.

Because the OTA aggregator 110 is able to assemble the reservation piecemeal from all of the OTAs, the OTA aggregator 110 is able to make reservations through multiple OTAs. Thus, the OTA aggregator 110 navigates around periods of unavailability through the various OTAs and assembles multiple reservations through multiple OTAs to complete the desired itinerary for the consumer. Thus, the OTA aggregator 110 is able to display that an itinerary is available at a desired room class and property while other OTAs display that the itinerary is unavailable. The OTA aggregator 110 is also able to display that an itinerary is available at a desired room class and property while other OTAs can only display that only a more-expensive room class is available.

In some embodiments of the invention, OTA aggregator 110 can also be configured to identify a block of nights within a window that will yield the lowest possible rate for a consumer's stay. For example, if a consumer desires to book a five-night stay but has the flexibility of booking the five night stay within a ten night window, OTA aggregator 110 can identify which block of five consecutive nights within the ten-night window will yield the lowest overall rate. Table 3 illustrates an example of how this can be accomplished.

TABLE 3

| Night | OTA A Rate | OTA B Rate | OTA C Rate | Lowest Daily Rate | Total Rate of Five Night Block Starting with Date |
|---|---|---|---|---|---|
| Sunday 6/1 | 420.00 | 409.00 | 420.00 | 409.00 | 879.00 |
| Monday 6/2 | 125.00 | 132.00 | 125.00 | 125.00 | 795.00 |
| Tuesday 6/3 | 125.00 | 132.00 | 125.00 | 125.00 | 970.00 |
| Wednesday 6/4 | 125.00 | 110.00 | 125.00 | 110.00 | 1,254.00 |
| Thursday 6/5 | 125.00 | 110.00 | 125.00 | 110.00 | 1,269.00 |
| Friday 6/6 | 325.00 | 340.00 | 340.00 | 325.00 | 1,284.00 |
| Saturday 6/7 | 310.00 | 310.00 | 300.00 | 300.00 | N/A |
| Sunday 6/8 | 420.00 | 409.00 | 420.00 | 409.00 | N/A |
| Monday 6/9 | 125.00 | 132.00 | 125.00 | 125.00 | N/A |
| Tuesday 6/10 | 125.00 | 132.00 | 125.00 | 125.00 | N/A |

Table 3 lists the ten-night window of Sunday June 1 to Tuesday June 10 during which the consumer has indicated he is available for a five night stay. As described above, OTA aggregator 110 can identify the nightly rate offered by each OTA for each date in the ten-night window and identify the lowest rate for each date. With this information, OTA aggregator 110 can calculate the total rate over each possible block of five consecutive nights in the ten-night window. These calculated total rates are shown in the far right column.

As shown, the five-night block commencing on Sunday, June 1 has a total rate of $879, the five night block commencing on Monday, June 2 has a total rate of $795, the five night block commencing on Tuesday, June 3 has a total rate of $970, and so on. OTA aggregator 110 can identify that the five night block starting on Monday, June 2 is the least expensive and can recommend that the consumer book his stay for Monday, June 2 until Saturday, June 7 (i.e. to stay over Monday through Friday nights).

In this way, OTA aggregator 110 is able to assist the consumer in further reducing the total cost of a stay when the consumer has flexibility in which nights he stays. OTA aggregator 110 can provide an interface through which the consumer can specify the window over which he will be available to stay as well as the number of nights that he desires to stay.

In some embodiments, OTA aggregator 110 can also identify when shortening a stay may result in a significant savings in the total cost of a stay. For example, referring again to table 3, OTA aggregator 110 can identify that a four-night stay commencing on Monday, June 2 would have a total cost of $470 which is $325 less than any other five-night block in the ten-night window. In such cases, OTA aggregator 110 can recommend to the consumer that he consider staying one night less to receive substantial savings on the total cost of the stay.

In some embodiments, OTA aggregator 110 can also be configured to identify the block within a window that will yield the lowest overall cost based on other factors in addition to the cost of staying in a hotel. Table 4 illustrates an example, similar to the example in table 3, where the cost of a flight is also considered in determining which five-night block yields the lowest overall cost within the ten-night window.

TABLE 4

| Night | OTA A Rate | OTA B Rate | OTA C Rate | Lowest Daily Rate | Total Cost of Flights on Beginning and Ending Dates of Block | Total Travel Cost of Block |
|---|---|---|---|---|---|---|
| Sunday 6/1 | 420.00 | 409.00 | 420.00 | 409.00 | 1,200.00 | 2,079.00 |
| Monday 6/2 | 125.00 | 132.00 | 125.00 | 125.00 | 1,300.00 | 2,095.00 |
| Tuesday 6/3 | 125.00 | 132.00 | 125.00 | 125.00 | 850.00 | 1,820.00 |
| Wednesday 6/4 | 125.00 | 110.00 | 125.00 | 110.00 | 500.00 | 1,754.00 |
| Thursday 6/5 | 125.00 | 110.00 | 125.00 | 110.00 | 500.00 | 1,769.00 |
| Friday 6/6 | 325.00 | 340.00 | 340.00 | 325.00 | 750.00 | 2,034.00 |
| Saturday 6/7 | 310.00 | 310.00 | 300.00 | 300.00 | N/A | N/A |
| Sunday 6/8 | 420.00 | 409.00 | 420.00 | 409.00 | N/A | N/A |
| Monday 6/9 | 125.00 | 132.00 | 125.00 | 125.00 | N/A | N/A |
| Tuesday 6/10 | 125.00 | 132.00 | 125.00 | 125.00 | N/A | N/A |

Table 4 includes the same nightly rates for OTAs A, B, and C as were shown in table 3. In addition, table 4 includes the total cost of flights on the beginning and ending days of each five-night block. Each flight cost can represent the cost of a round-trip ticket on the corresponding dates purchased from a single airline, or can represent a combination of one way tickets on the corresponding dates. For example, for Sunday, June 1, the total cost of flights is shown as $1,200 which may represent the combined cost of an outbound flight on Sunday June 1 and an inbound flight on Friday June 6 whether the outbound and inbound flights are purchased as a roundtrip ticket or as separate one way flights on the same or different airline. In any case, OTA aggregator 110 can be configured to identify the lowest possible cost for airfare for each block in the window.

Table 4 also shows that the rightmost column contains the total travel cost of each possible five-night block where the total travel cost is the sum of the lowest possible hotel rate and the lowest cost for airfare for each block. With the cost of airfare considered in the calculation of total cost, OTA aggregator 110 can determine that the block starting on Wednesday, June 4 yields the lowest total cost of traveling.

By comparing table 4 to table 3, it can be seen that OTA aggregator 110 can assist the consumer in saving $341 on total travel costs. Specifically, if the cost of airfare is not considered as in table 3, OTA aggregator 110 may recommend staying from Monday, June 2 to Saturday, June 7 because the hotel costs are lowest for this block. However, with the cost of airfare considered as in table 4, this Monday to Saturday block has a total cost of $2,095 which is $341 more than the total cost of the Wednesday, June 4 to Monday, June 9 block.

OTA aggregator 110 can be configured to consider other types of costs in determining which block in a window yields the lowest overall travel costs. For example, if the consumer desires to rent a car during the five-night block, OTA aggregator 110 can identify the cost of renting a car over each possible five-night block and add this cost to the calculated total cost for each block. Similarly, if the consumer desires to attend an attraction during the five-night stay, OTA aggregator 110 can identify the cost of attending the attraction on each date in the ten-night window and use these costs in determining the total travel costs for a particular block.

In each of these ways, OTA aggregator 110 can be used to identify which block of nights within a window will provide the lowest total travel costs. As with identifying the lowest rate for a hotel stay described above, OTA aggregator 110 can consider various constraints when calculating the total travel cost for each block. For example, the consumer can specify that he will only fly on direct flights, and therefore OTA aggregator 110 may only consider the cost of airfare for direct flights for each block. Similarly, the consumer can specify that he will only visit an attraction on one or more particular dates, and in response, OTA aggregator 110 may only consider the cost of attending the attraction on the specified dates.

The foregoing examples illustrate the benefits provided by the OTA aggregator 110 and the methods and systems for compiling a composite reservation from multiple bookings. The above examples primarily described multiple bookings at a single location (e.g. a single hotel). However, the same approach can be used to obtain multiple bookings at many locations. For example, referring to table 3 above, in some embodiments, the OTA A, B, or C rate for some nights in the window may be for a different hotel (i.e. the hotel having the lowest rate for the night). In such cases, the five-night block can include stays at multiple hotels if doing so yields the lowest rate for the five-night block. In some embodiments, OTA aggregator 110 can allow the consumer to specify whether he is willing to switch hotels during the block. If so, OTA aggregator 110 can identify the block within the consumer's available window having the lowest rate for a five-night block even if the block requires switching hotels during the block.

In some embodiments, when a block includes stays at multiple hotels, or when OTA aggregator 110 is used to identify a block having the lowest cost for a stay and another travel expense such as airfare, car rental, etc., OTA aggregator 110 can combine each night stayed at one or more locations and/or any reservations for other travel related expenses into a single confirmation for the entire block. In this manner, the fact that the block is made up of multiple single reservations can be further obscured from the consumer. A similar approach can be used by OTA aggregator 110 to combine the charges for each of these single reservations into a single charge to a credit card or other payment device.

In further embodiments, OTA aggregator 110 can also provide an optimization for exploiting biases used by some OTAs against some IP addresses. For example, some OTAs provide discounts to some regions of IP addresses, while charging more to others. The present invention identifies and exploits these biases to optimize for IP address location. In some embodiments, this can be accomplished by having OTA aggregator 110 use an IP address within a favored region or grouping while placing a reservation so that the discount provided to the favored region or grouping is received by the consumer regardless of the consumer's actual IP address.

Similarly, in some embodiments, OTA aggregator 110 may communicate with OTAs using multiple IP addresses (e.g. using IP addresses from multiple regions in a country or multiple IP addresses from different countries or regions. If one IP address receives a lower price from an OTA, this IP address can become the default for subsequently communicating with the OTA for placing reservations.

Prior art search results produce the lowest cost single supplier blocks available for a fixed time period. The present invention combines the lowest cost daily-optimized pricing from among many suppliers to result in a chain of daily optimized results which are combined to make a block for a fixed time period. In addition, some embodiments utilize this daily focus to examine multiple permutations within a larger available time frame to combine to create the most optimal block within the flexible time frame. By evaluating all combinations of optimal contiguous daily results from multiple suppliers, an optimized block can be determined. Some embodiments delve even further into this complex environment by not only optimizing a block of room reservations, but also consider all permutations of air fare, car rentals and other options determined by the user in combination to optimize an entire trip within a flexible time frame. In some embodiments, these strings of daily optimized results are stitched together into one confirmation for the entire block.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

We claim:

1. A system for requesting lodging rate information from a lodging rate source, the system comprising:
    a lodging rate server computer having a list of IP addresses showing different geographical locations, said lodging rate server computer being specialized to change the IP address from which a request is occurring, the lodging rate server computer configured to:
    send a plurality of requests to the lodging rate source for lodging rate information for a plurality of nights, at least two of the plurality of requests being sent using IP addresses associated with disparate geographical locations;
    receive from the lodging rate source and for each of the plurality of requests, lodging rate information for each of the nights;
    identify a lowest lodging rate for each of the nights from the received lodging rate information including identifying the IP address used to receive the lodging rate information with the lowest lodging rate for each of the nights, wherein the lowest lodging rate for at least two nights is received using different IP addresses;
    for each of the nights, send a request to the lodging rate source to place a reservation for the night using the IP address which was used to receive the lodging rate information with the lowest lodging rate for the night; and
    combine the reservation for each of the nights into a single confirmation.

2. The system of claim 1, wherein the IP addresses are associated with different states within a country, with different countries, or with different continents.

3. The system of claim 1, further comprising:
    wherein the lodging rate server computer is further configured to:
    send a second plurality of requests to a second lodging rate source for lodging rate information for the plurality of nights, at least two of the second plurality of requests being sent using IP addresses associated with different geographical locations;
    receive, from the second lodging rate source and for each of the second plurality of requests, lodging rate information for each of the nights;
    wherein identifying the lowest lodging rate for each of the nights from the received lodging rate information comprises identifying the lowest lodging rate from among the lodging rate information received from the lodging rate source and the second lodging rate source; and
    wherein sending the request to the lodging rate source to place a reservation for each of the nights comprises sending the request to the lodging rate source offering the lowest lodging rate for the night using the IP address which was used to receive the lodging rate information with the lowest lodging rate for the night.

4. The system of claim 1, further comprising:
    using one of the IP addresses which was used to obtain the lodging rate information with the lowest lodging rate for at least one night as a default IP address for requesting lodging rate information from the lodging rate source.

5. The system of claim 1, further comprising:
    wherein the lodging rate server computer is further configured to:
    receive, from a consumer, a request to identify the lowest rate for a multi-night lodging stay at a lodging location, the request identifying a number of nights for the multi-night lodging stay and a window of nights during which the consumer is available to stay at the lodging location, the window encompassing more nights than the number of nights identified in the request such that a plurality of different blocks of consecutive nights exist within the window;
    for each different block in the window, calculate a total rate for placing reservations at the lodging location for each night in the block, the total rate for each block comprising the sum of the lowest lodging rate for each night in the block;
    identify which of the plurality of blocks in the window has the lowest total rate; and
    display, to the consumer, a recommendation to place a reservation at the lodging location for each night in the identified block with the lowest total rate.

6. The system of claim 5, further comprising:
    wherein the lodging rate server computer is further configured to:
    generate a plurality of lodging reservations corresponding to the identified block with the lowest total rate, wherein at least two of the lodging reservations correspond to different nights of the multi-night lodging stay and are placed through different lodging reservation systems.

7. The system of claim 5, wherein the system further comprises obtaining lodging rate information from the lodging rate source corresponding to a plurality of all permutations of stays of varying lengths within the window to locate any special rates available for multi-night stays that are less than the number of nights identified in the request.

8. The system of claim 5, further comprising:
wherein the lodging rate server computer is further configured to:
update the lodging rate information from the lodging rate source throughout a period of time during which any lodging reservation is subject to cancellation;
automatically compare current rate information to rates of the reservations for each of the nights; and
when a current rate for a given night is less than a rate at which the given night was reserved:
automatically cancel an original reservation for the given night; and
automatically make a new reservation for the given night at the current rate.

* * * * *